US012674898B2

(12) United States Patent
Katoh

(10) Patent No.: US 12,674,898 B2
(45) Date of Patent: Jul. 7, 2026

(54) RADIATION DOSE DETECTION DEVICE AND RADIATION DOSE DETECTION METHOD

(71) Applicant: Nuvoton Technology Corporation Japan, Kyoto (JP)

(72) Inventor: Yoshikazu Katoh, Osaka (JP)

(73) Assignee: Nuvoton Technology Corporation Japan, Kyoto (JP)

( * ) Notice: Subject to any disclaimer, the term of this patent is extended or adjusted under 35 U.S.C. 154(b) by 147 days.

(21) Appl. No.: 18/894,434

(22) Filed: Sep. 24, 2024

(65) Prior Publication Data

US 2025/0012931 A1 Jan. 9, 2025

Related U.S. Application Data

(63) Continuation of application No. PCT/JP2023/011651, filed on Mar. 23, 2023.

(30) Foreign Application Priority Data

Mar. 29, 2022 (JP) ................................ 2022-053592

(51) Int. Cl.
G01T 1/02 (2006.01)

(52) U.S. Cl.
CPC .................................... G01T 1/026 (2013.01)

(58) Field of Classification Search
None
See application file for complete search history.

(56) References Cited

U.S. PATENT DOCUMENTS

2011/0068890 A1* 3/2011 Yang ...................... H01C 7/041
29/612
2011/0260070 A1* 10/2011 Polishchuk ............. G01T 1/026
250/371
2019/0005282 A1 1/2019 Usami et al.

FOREIGN PATENT DOCUMENTS

JP 61-161480 A 7/1986
JP 2016-031274 A 3/2016
JP 6487070 B2 3/2019
WO WO-2017115340 A1 * 7/2017 ............... G01T 3/00

OTHER PUBLICATIONS

International Search Report dated May 23, 2023 issued in International Patent Application No. PCT/JP2023/011651, with English translation.

* cited by examiner

*Primary Examiner* — Marcus H Taningco
(74) *Attorney, Agent, or Firm* — Rimon P.C.

(57) ABSTRACT

A radiation dose detection device includes: a power supply circuit that outputs a power supply voltage; a temperature sensor unit that functions as a first current source that outputs a first current dependent on the ambient temperature, using the power supply voltage; a radiation sensor unit that functions as a second current source that outputs a second current dependent on the dose of radiation to the radiation dose detection device, using the power supply voltage; and a detection circuit that outputs a first signal indicating the temperature corresponding to the magnitude of the first current, and a second signal indicating the dose of radiation corresponding to the magnitude of the second current. The temperature sensor unit includes one or more resistance change elements each including a variable resistance layer containing a transition metal oxide. The second current source includes a transistor.

8 Claims, 7 Drawing Sheets

FIG. 2

RADIATION DOSE DETECTION DEVICE AND RADIATION DOSE DETECTION METHOD

CROSS REFERENCE TO RELATED APPLICATIONS

This is a continuation application of PCT International Application No. PCT/JP2023/011651 filed on Mar. 23, 2023, designating the United States of America, which is based on and claims priority of Japanese Patent Application No. 2022-053592 filed on Mar. 29, 2022. The entire disclosures of the above-identified applications, including the specifications, drawings and claims are incorporated herein by reference in their entirety.

FIELD

The present disclosure relates to a radiation dose detection device and a radiation dose detection method, and specifically to a radiation dose detection device with a function capable of addressing a change in the characteristics due to exposure to radiation.

BACKGROUND

Radiation, such as gamma rays, may have harmful influences on microelectronics. Many years of research has revealed various influences of radiation on microelectronics, and it has been pointed out that these influences cause problems in normal operations and functions of the microelectronics. Exposure to radiation causes temporary and irreversible permanent damages in integrated circuits. The former is represented by soft errors (also called "single event effects"), such as logical inversion of data in a flip-flop or a random-access memory (RAM). The latter is represented by a shift of an on-voltage (in other words, threshold voltage VT) of a transistor and an increase in a leakage current.

For example, medical equipment, pharmaceutical containers, and even food items, such as spices, are sterilized by radiation. In order to add RF tags to such products and packages and to ensure inventory management and traceability of the products, the RF tags need to operate normally even after exposure to the radiation.

As illustrated in Patent Literature (PLT) 1, if an RF tag has a sensing function as a radiation sensor or a temperature sensor, for example, there is a demand to keep a certain level of performance in terms of sensing accuracy. However, semiconductor integrated circuits typically include a regulator circuit for generating an operating voltage in the integrated circuit based on a power supply voltage input from the outside. In order to cause the regulator circuit to generate a predetermined voltage, a bandgap reference circuit is mounted which generates a reference voltage serving as a reference of the predetermined voltage. Since the regulator circuit and the bandgap reference circuit are well-known techniques, detailed description will be omitted here.

Fluctuations of the reference voltage generated by the bandgap reference circuit are usually trimmed and adjusted by pre-shipment inspection of the RF tag to output a desired voltage. Accordingly, the power supply voltage output by the regulator circuit is also adjusted to a voltage within a predetermined range. Under the power supply voltage adjusted to fall within the predetermined range described above, the sensing operation of RF tags similarly equipped with sensor elements is calibrated in a post-manufacturing inspection. For example, in the case of a temperature sensor, the relationship between the physical quantity obtained from the sensor element and the temperature (i.e., the temperature characteristic) is calibrated under the power supply voltage with all RF tags adjusted to the predetermined range, and an accurate temperature is obtained in accordance with the obtained physical quantity.

However, when threshold voltage VT of the transistor changes due to exposure to radiation in a field after shipment, the reference voltage changes from that before the exposure and the generated power supply voltage changes accordingly. If the power supply voltage that operates after the radiation differs from that at the time of calibration, the relationship between the physical quantity obtained from the sensor element and the temperature changes, an accurate temperature cannot be obtained. The same applies to a radiation detection circuit using a radiation sensor element. If the transistor is exposed to an even higher dose of radiation, threshold voltage VT shifts largely, and the power supply voltage fluctuates beyond the normal operating limits of the tag, the RF tag itself malfunctions.

For example, PTL 2 illustrates a method of monitoring the influences on a semiconductor integrated circuit being exposed to radiation and measuring the amount of exposure. PTL 2 suggests monitoring the amount of exposure utilizing the fact that the frequency of the pulse generated by a ring oscillator mounted on the semiconductor integrated circuit changes depending on the amount of exposure. PTL 3 suggests monitoring the ambient temperature of a semiconductor integrated circuit using a resistance change element based on the characteristic that a resistance changes depending on a temperature and a change in the oscillation frequency of an oscillator based on the resistance due to a temperature change.

CITATION LIST

Patent Literature

PTL 1: Japanese Patent No. 6487070
PTL 2: Japanese Unexamined Patent Application Publication No. S61-161480
PTL 3: Japanese Unexamined Patent Application Publication No. 2016-31274

SUMMARY

Technical Problems

However, none of the devices suggested in PTLs 1 to 3 addresses the problem of being affected by a fluctuation of the power supply voltage due to exposure to radiation and causing degraded sensing accuracy. Specifically, the background art described above suggests sensing a temperature, radiation, and other ambient environments and collecting information using RF tags. However, once a semiconductor integrated circuit is exposed to radiation, the transistors forming the integrated circuit are irreversibly damaged, and the power supply voltage fluctuates from the initial value, arising problems such as failure in normal sensing or degraded accuracy. To address the problem, it is an objective of the present disclosure to provide a radiation dose detection device with a function capable of detecting not only the dose of radiation but also a temperature, and addressing a change in the characteristics due to exposure to radiation, and a radiation dose detection method using the radiation dose detection device.

Solutions to Problems

In order to achieve the objective, a radiation dose detection device according to an aspect of the present disclosure includes a power supply circuit that outputs a power supply voltage; a first current source that outputs a first current dependent on an ambient temperature of the radiation dose detection device, using the power supply voltage; a second current source that outputs a second current dependent on a dose of radiation to the radiation dose detection device, using the power supply voltage; and a detection circuit that outputs a first signal indicating a temperature corresponding to a magnitude of the first current, and a second signal indicating a dose of radiation corresponding to a magnitude of the second current. The first current source includes: one or more resistance change elements each including a first electrode layer, a second electrode layer, and a variable resistance layer between the first electrode layer and the second electrode layer, the variable resistance layer containing a transition metal oxide; a first node connecting the first electrode layers of the one or more resistance change elements; and a second node connecting the second electrode layers of the one or more resistance change elements. The first node is applied with the power supply voltage. The second node outputs the first current. The second current source includes a transistor. One terminal of the transistor is applied with the power supply voltage. An other terminal of the transistor outputs the second current.

In order to achieve the objective, a radiation dose detection method according to an aspect of the present disclosure is a radiation dose detection method using the radiation dose detection device described above. The radiation dose detection method includes: before radiation, obtaining a first correlation between the ambient temperature and the count value output by the counter circuit, while the first current is selected by the selection circuit; after the radiation, obtaining a second correlation between the ambient temperature and the count value output by the counter circuit, while the first current is selected by the selection circuit; adjusting the reference voltage to make the first correlation equal to the second correlation; and after the adjusting, detecting the dose of the radiation, while the second current is selected by the selection circuit.

Advantageous Effects

The present disclosure provides a radiation dose detection device with a function capable of detecting not only the dose of radiation but also a temperature, and addressing a change in the characteristics due to exposure to radiation, and a radiation dose detection method using such a radiation dose detection device.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 2 is a block diagram showing an example configuration of the radiation dose detection device according to the embodiment.

DESCRIPTION OF EMBODIMENT

Finding by Present Inventors

Figure 1:
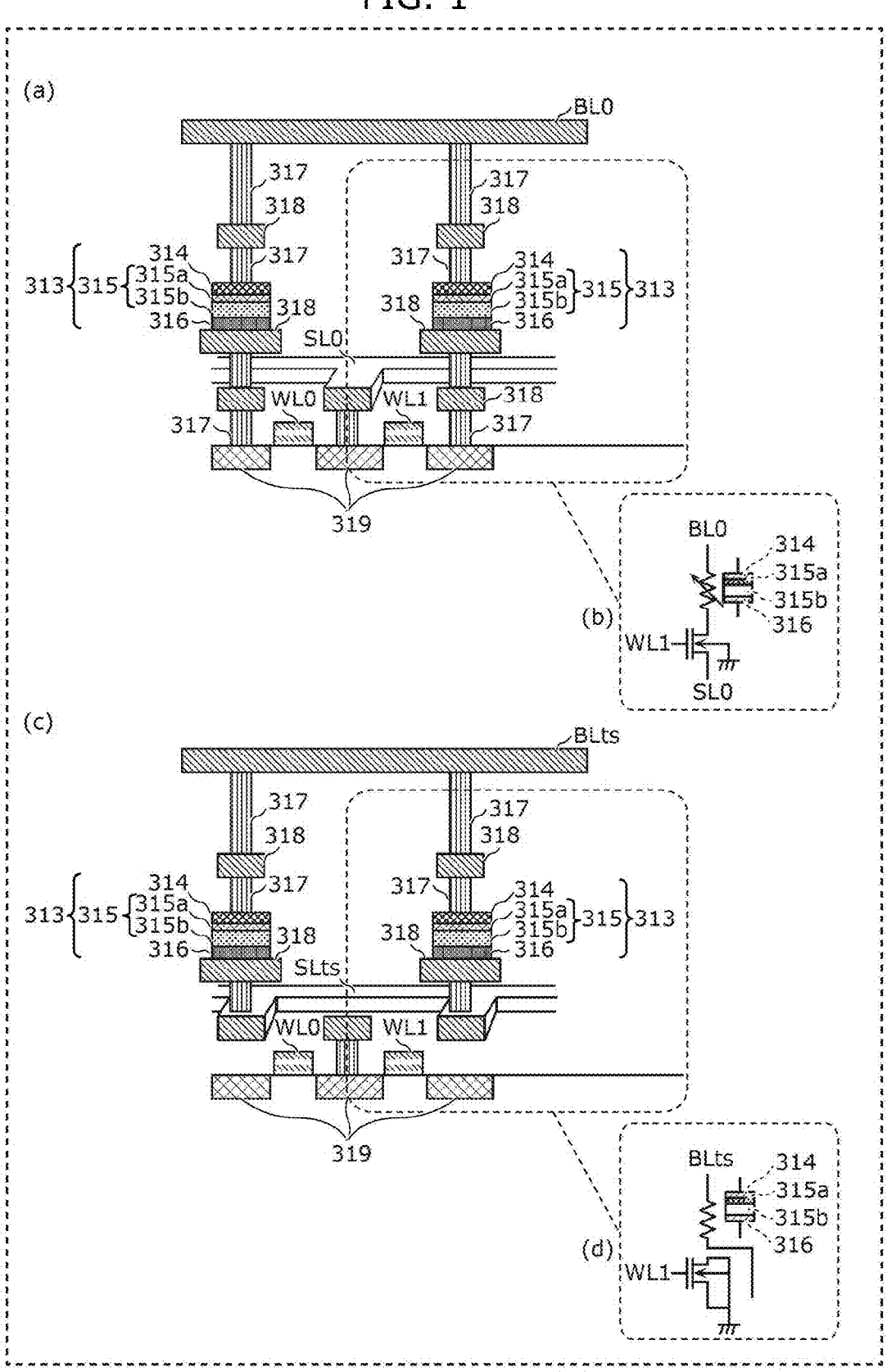
FIG. 1 shows a structure of a resistance change element included in a radiation dose detection device according to an embodiment.

After various studies, the present inventors have found that a transition metal oxide used for a resistance change element made of transition metal has excellent temperature change characteristics and is hardly influenced by exposure to radiation. A resistance change element containing a transition metal oxide is built in a radiation dose detection device. After the exposure to the radiation, the power supply voltage of the radiation dose detection device can be recovered (i.e., calibrated) to the value as of before the exposure to the radiation. Accordingly, the present inventors have arrived at the following finding. A radiation dose detection device including a resistance change element containing a transition metal oxide can not only detect a temperature in addition to the dose of radiation, but also address a change in the characteristics of the radiation dose detection device due to the exposure to radiation. That is, radiation-resistant temperature detection and radiation dose detection become possible.

EMBODIMENT

Now, an embodiment of the present disclosure will be described in detail with reference to the drawings. The embodiment described below is merely a specific example of the present disclosure. The numerical values, shapes, materials, elements, the arrangement and connection of the elements, steps, step orders etc. shown in the following embodiment are thus mere examples, and are not intended to limit the scope of the present disclosure. The figures are not necessarily drawn strictly to scale. The same reference signs represent substantially the same configurations in the drawings and redundant description will be omitted or simplified. The term "connect" means electrical connection and includes not only direct connection of two circuit elements but also indirect connection of two circuit elements with another circuit element interposed therebetween. The term "on [XX]" can include both the case where something is in contact with XX and the case where something is not in contact with XX.

First, a representative example of a resistance change element applied to the radiation dose detection device according to the present disclosure and how to apply the resistance change element to a temperature sensor will be described.

Resistance Change Element

FIG. 1 shows a structure of a resistance change element included in a radiation dose detection device according to an embodiment. In FIG. 1, (a) is a cross-sectional view of a memory cell using the resistance change element. Source/drain regions are provided on a semiconductor substrate to form selection transistors 319 used for selecting the memory cell. In (a) of FIG. 1, BL0 represents the $0^{th}$ bit line, WL0 and WL1 represent the $0^{th}$ and $1^{st}$ word lines, respectively, and SL0 represents the $0^{th}$ source line. It is found from (a) of FIG. 1 that word lines, bit lines, source lines intersect each other to be orthogonal using different wiring layers. In FIG. 1, (a) also shows plug layer 317 and metal wiring layer 318. Non-volatile memory elements used to store information are here resistance change elements 313 with a resistance that changes depending on the voltage for applying an electrical stress and the direction (polarity) of the application.

As shown in (a) of FIG. 1, resistance change elements 313 are formed between second lowest metal wiring layer 318 and third lowest metal wiring layer 318. The locations of resistance change elements 313 are not limited thereto and may be changed for process reasons. Each of resistance change elements 313 shown in (a) of FIG. 1 includes: first electrode layer 316 on second lowest metal wiring layer 318; second electrode layer 314; and variable resistance layer 315 between first electrode layer 316 and second electrode layer 314. In this embodiment, variable resistance layer 315 includes, as an example, first tantalum oxide layer 315b and second tantalum oxide layer 315a on first tantalum oxide layer 315b. First tantalum oxide layer 315b (hereinafter also referred to as a "first tantalum oxide layer" or simply as a "first oxide layer") has a lower oxygen content. Second tantalum oxide layer 315a (hereinafter also referred to as a "second tantalum oxide layer" or simply as a "second oxide layer") has a higher oxygen content.

Note that variable resistance layer 315 only needs to be made of an oxygen-deficient resistance change material including two layers with different oxygen contents. The basic material is not limited to tantalum. Another metal forming variable resistance layer 315 may be at least any of a transition metal or aluminum (Al). Examples of the transition metal include tantalum (Ta), titanium (Ti), hafnium (Hf), zirconium (Zr), niobium (Nb), tungsten (W), nickel (Ni), and iron (Fe). Transition metals can have multiple oxidation states and thus can achieve different resistance states through redox reactions.

In order to drive these resistance change elements 313, a voltage generated from an external power supply and meeting predetermined conditions is applied between first electrode layer 316 and second electrode layer 314. In accordance with the direction (i.e., polarity) of applying the voltage, the resistance of variable resistance layer 315 of each resistance change element 313 increases or decreases reversibly, and can shift between at least two states: a high-resistance state (HR state) with a higher resistance and a low-resistance state (LR state) with a lower resistance than the high resistance state. After the stop of voltage application, the resistance state can be held and used for recording information in accordance with the state.

Example materials of first electrode layer 316 and second electrode layer 314 include platinum (Pt), iridium (Ir), tungsten (W), copper (Cu), aluminum (Al), titanium nitride (TiN), tantalum nitride (TaN), and titanium aluminum nitride (TiAlN).

The area surrounded by the broken line in (a) of FIG. 1 serves as one memory cell whose circuit diagram is shown in (b) of FIG. 1. It is found from (b) of FIG. 1 that each resistance change element 313 and the drain terminal of corresponding selection transistor 319 are connected in the memory cell. In the following, the memory cell is based on (b) of FIG. 1 for describing the elements of the whole non-volatile memory.

On the other hand, (c) of FIG. 1 shows a structure of resistance change elements 313 used as temperature sensors. In FIG. 1, (c) shows the structure in which resistance change elements 313 and selection transistors 319 are separated (i.e., disconnected) in the memory cell shown in (a) of FIG. 1. The circuit diagram of the area surrounded by the broken line in (c) of FIG. 1 is shown in (d) of FIG. 1. It is found from (d) of FIG. 1 that each resistance change element 313 used for a temperature sensor and the drain terminal of corresponding selection transistor 319 are not connected unlike in the memory cell shown in (a) and (b) of FIG. 1. That is, resistance change element 313 shown in (c) of FIG. 1 functions not as a memory cell but as a temperature sensor.

In this manner, the radiation dose detection device according to this embodiment includes resistance change elements 313 as non-volatile memory elements forming a memory cell, and resistance change elements 313 as temperature sensors.

Next, an example configuration of a radiation dose detection device including a non-volatile memory using resistance change elements 313 shown in FIG. 1 will be described.

Figure 2:
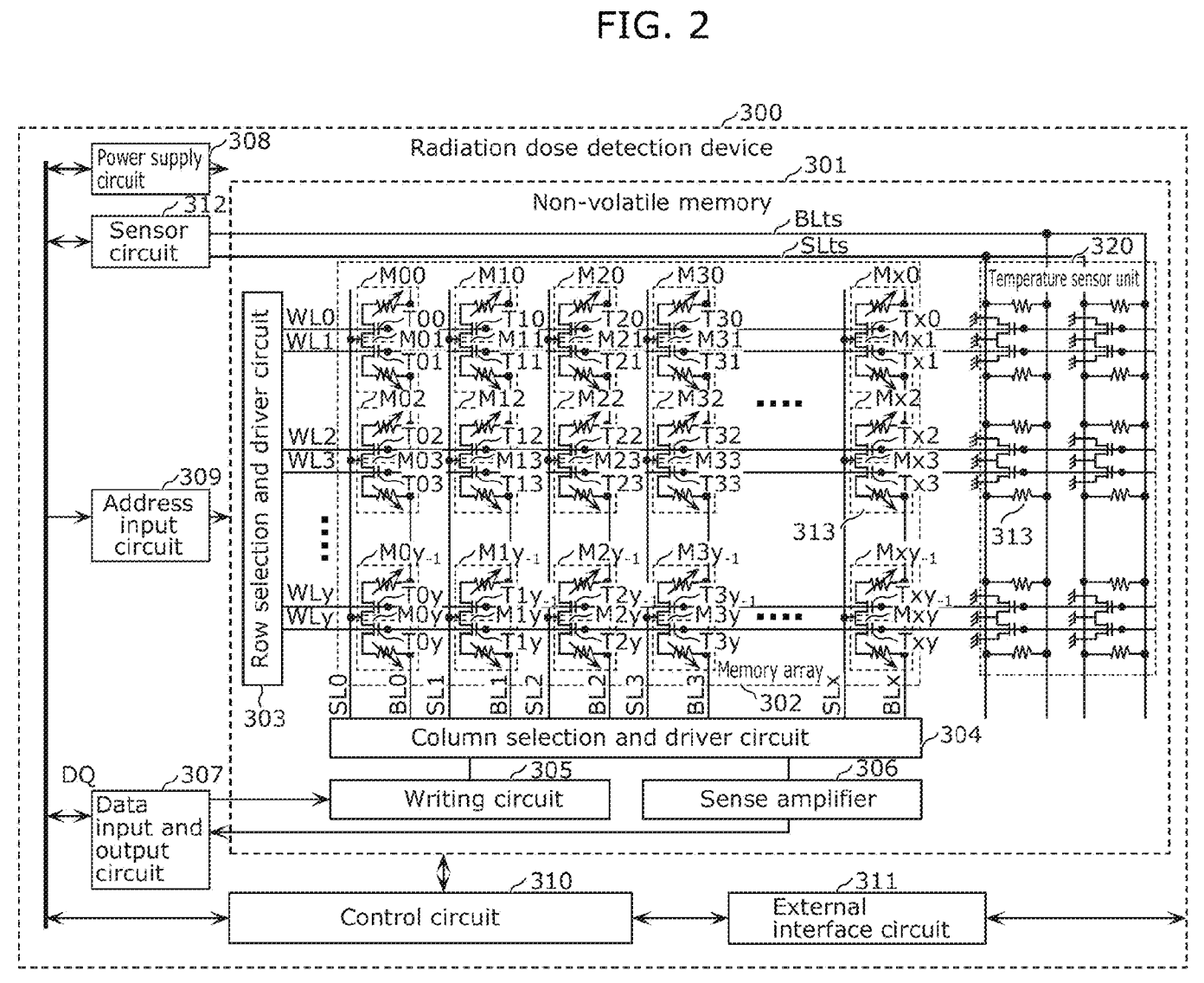

FIG. 2 is a block diagram showing an example configuration of radiation dose detection device 300 according to the embodiment. As shown in FIG. 2, radiation dose detection device 300 according to this embodiment is configured by a semiconductor integrated circuit including non-volatile memory 301 on a semiconductor substrate. This non-volatile memory 301 is equipped with memory array 302, row selection and driver circuit 303, column selection and driver circuit 304, writing circuit 305, sense amplifier 306, and data input and output circuit 307. Memory array 302 includes memory cells M00 to Mxy arranged two-dimensionally. Writing circuit 305 is for writing information. Sense amplifier 306 detects the amount of current flowing through the selected one of memory cells M00 to Mxy via a selected bit line, and determines which one of data "1" or "0" the information stored in the selected one of memory cells M00 to Mxy indicates. Data input and output circuit 307 performs input and output processing of input and output data via signal node DQ.

Radiation dose detection device 300 also includes power supply circuit 308, address input circuit 309, external interface circuit 311, and control circuit 310. Power supply circuit 308 generates, from the external power supply, various power supplies used inside the memory. Address input circuit 309 outputs an address signal to non-volatile memory 301. External interface circuit 311 sends and receives address signals, data, and control signals to and from the outside of the device. Control circuit 310 controls whole radiation dose detection device 300 based on the signals input and output via external interface circuit 311. Note that control circuit 310 includes, for example, a memory storing control programs, and a processor that executes the control programs.

Radiation dose detection device 300 further includes temperature sensor unit 320 and sensor circuit 312. Temperature sensor unit 320 is created utilizing a part of memory array 302 and senses the ambient temperature. Sensor circuit 312 outputs the data correlated with the temperature, using temperature sensor unit 320. Temperature sensor unit 320 has the structure and circuit configuration shown in (c) and (d) of FIG. 1. Sensor circuit 312 has a radiation dose detection function which will be described later.

Memory array 302 includes, on the semiconductor substrate, a plurality of transistors T00, T01, . . . , Txy (hereinafter referred to as "transistors T00, T01, . . . ") and a plurality of memory cells M00, M01, . . . , Mxy (hereinafter referred to as "memory cells M00, M01, . . . "). Transistors T00, T01, . . . are provided at intersections between bit lines BL0, BL1, . . . , BLx and source lines SL0, SL1, . . . . SLx intersecting a plurality of word lines WL0, WL1, . . . , WLy that are parallel to each other. Memory cells M00, M01, . . . include resistance change elements 313 provided for transistors T00, T01, . . . in a one-to-one correspondence and connected in series.

Each of memory cells M00 to Mxy has the structure shown in (a) of FIG. 1 whose circuit diagram is as shown in (b) of FIG. 1. At this time, corresponding resistance change element 313 operates as a non-volatile memory element in the corresponding one of memory cells M00 to Mxy. Each of these memory cells M00 to Mxy includes one selection transistor 319 and one resistance change element 313 and is thus called a 1T1R memory cell.

Column selection and driver circuit 304 selects one bit line (BL) and one source line (SL). When row selection and driver circuit 303 selects one word line, one memory cell on the intersections among the selected bit line, source line, and word line is selected. That is, one memory cell is selected from memory array 302. While one memory cell is selected in the configuration of non-volatile memory 301 shown in FIG. 2, arranging the circuits in parallel to access a plurality of memory cells at the same time is a simple design matter.

Figure 3:
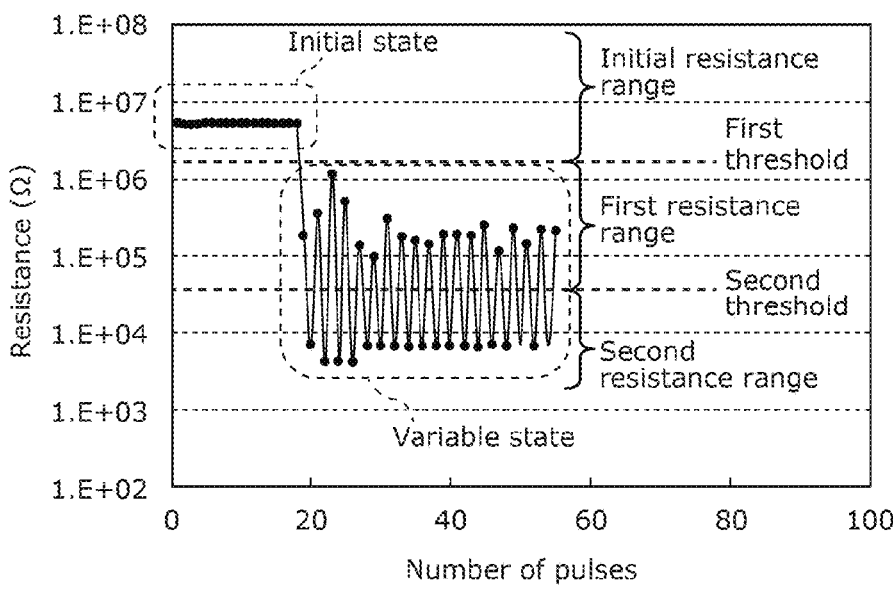
FIG. 3 is a graph showing an example resistance range of a resistance change element included in a memory cell shown in FIG. 2.

FIG. 3 is a graph showing an example resistance range of resistance change element 313 included in each of memory cells M00 to Mxy shown in FIG. 2. As illustrated in FIG. 3, resistance change element 313 included in each of memory cells M00 to Mxy has at least two states, namely, a variable state and an initial state. In the "variable state", the resistance shifts reversibly within a variable resistance range when different electrical signals are applied. In the "initial state", electrical stress is never applied to resistance change element 313 until the end of the semiconductor manufacturing process, and the resistance is within an initial, high resistance range which does not overlap the variable resistance range.

Resistance change element 313 in the initial state never becomes variable, unless forming stress is applied, which is electrical stress to make the element variable. For example, the forming stress may be cumulative electrical stress. In this case, when the amount of cumulative stress exceeds a predetermined amount, the element shifts from the initial state to the variable state.

In memory array 302 in FIG. 2, after the end of the semiconductor manufacturing process, all memory cells M00 to Mxy are selected individually, resistance change element 313 in each selected memory cell is applied with the forming stress so as to shift to the variable state, which enables storage of desired data and reading of the data stored as necessary.

On the other hand, resistance change elements 313 included in temperature sensor unit 320 are kept in the initial state. Each of resistance change elements 313 included in temperature sensor unit 320 has the configuration shown in (c) and (d) of FIG. 1. Specifically, the drain of selection transistor 319 has no plug layer 317 and is not connected to resistance change element 313 and grounded (the grounding is not shown). The source of selection transistor 319 is not connected to any source line and grounded (the grounding is not shown). All the plurality of resistance change elements 313 in temperature sensor unit 320 are connected in parallel between source line SLts for a temperature sensor and bit line BLts for a temperature sensor.

Figure 4:
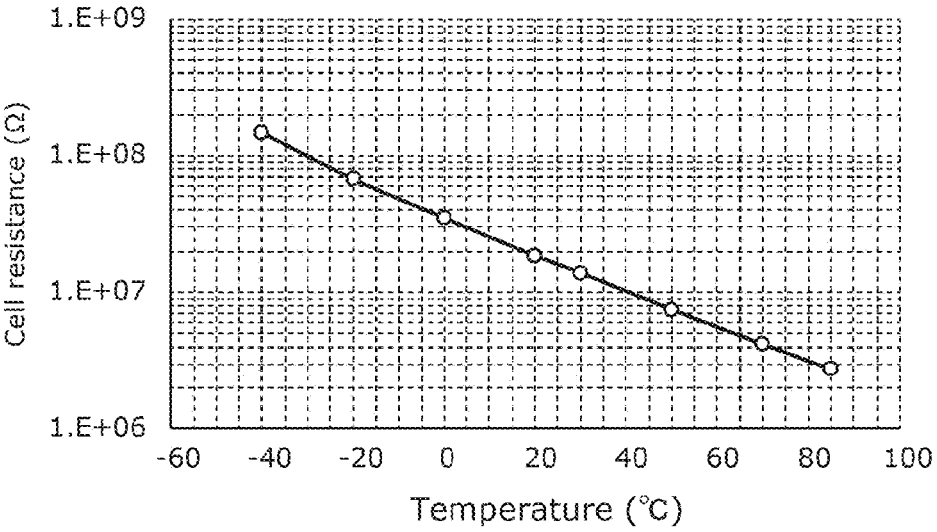
FIG. 4 is a graph showing example temperature characteristics of the resistance change element, in an initial state, forming a temperature sensor unit included in the radiation dose detection device according to the embodiment.

FIG. 4 is a graph showing example temperature characteristics of resistance change elements 313 in the initial state and forming temperature sensor unit 320 included in radiation dose detection device 300 according to the embodiment. An excellent resistance change is exhibited with respect to a temperature change. In temperature sensor unit 320, the plurality of resistance change elements 313 in the initial state are connected in parallel between bit line BLts for a temperature sensor and source line SLts for a temperature sensor. The resistance between bit line BLts for a temperature sensor and source line SLts for a temperature sensor is the combined resistance of the plurality of resistance change elements 313 in the initial state.

Figure 5:
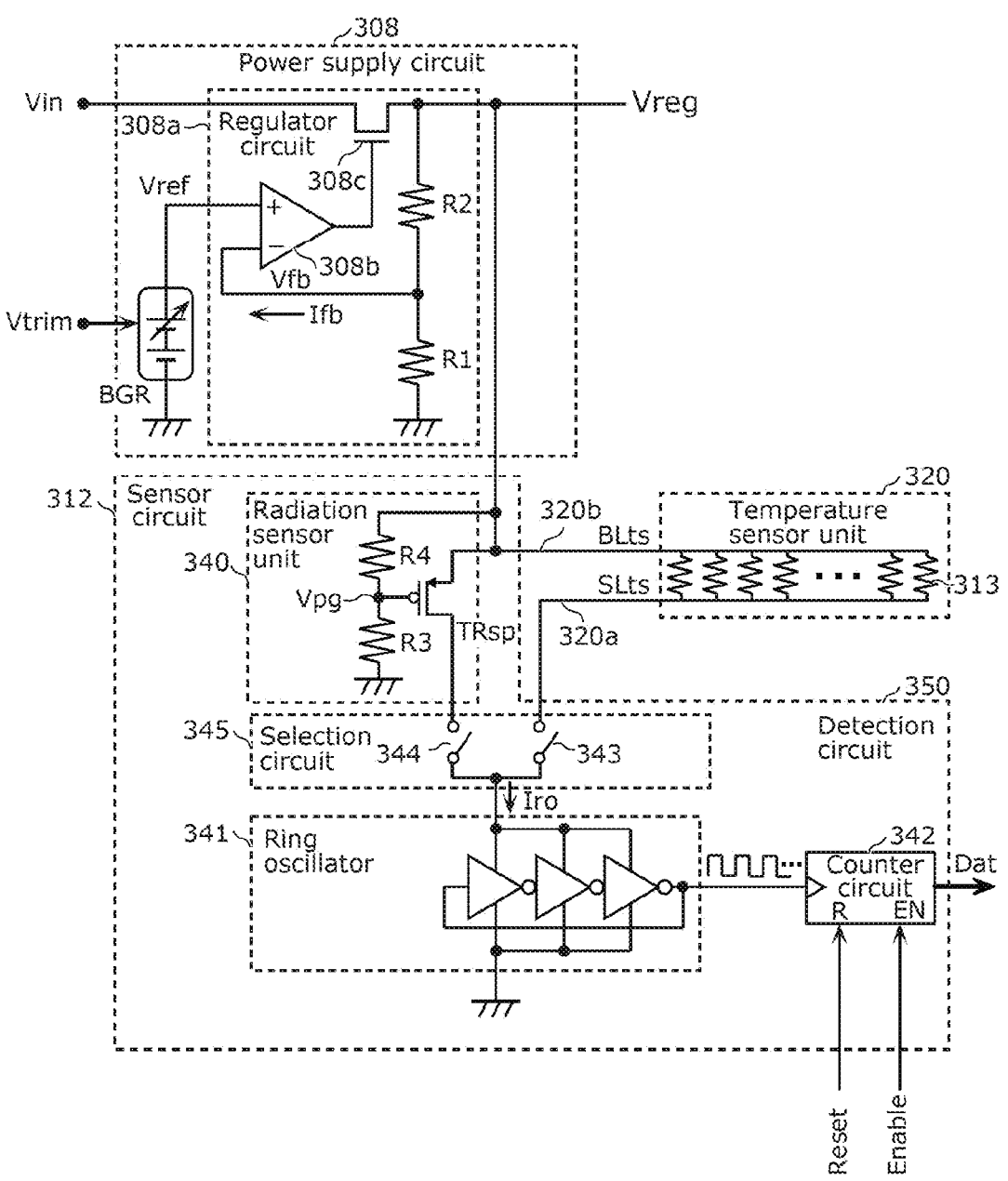
FIG. 5 is a block diagram showing a circuit configuration of a sensor circuit in FIG. 2.

FIG. 5 is a block diagram showing a circuit configuration of sensor circuit 312 in FIG. 2. This figure shows both the detailed circuit configurations of power supply circuit 308 and temperature sensor unit 320 to show the relations between the circuit and the surrounding circuits.

Power supply circuit 308 shown in FIG. 5 includes bandgap reference circuit BGR that generates reference voltage Vref that is adjustable, and regulator circuit 308a that outputs power supply voltage Vreg in accordance with reference voltage Vref. Regulator circuit 308a includes operational amplifier 308b, transistor 308c, and resistance elements R1 and R2. Operational amplifier 308b compares reference voltage Vref output by bandgap reference circuit BGR and divided voltages Vfb of resistance elements R1 and R2, and adjusts the voltage level at the gate of transistor 308c to make these voltages equal to each other. Thus, power supply voltage Vreg, which is the voltage output by power supply circuit 308, is expressed by the equation $Vreg=Vref\times(1+R2/R2)+Ifb\times R2$, where Ifb is the current flowing into the negative input terminal of operational amplifier 308b. Since current Ifd is extremely small, the right side of this equation is almost equal to $Vref\times(1+R2/R2)$. At this time, input voltage Vin input to transistor 308c is higher than output power supply voltage Vreg by the drop voltage of transistor 308c or more.

Reference voltage Vref output by bandgap reference circuit BGR is calibrated by adjustment voltage Vtrim input from control circuit 310. The calibration value by adjustment voltage Vtrim is determined at the time of pre-shipment inspection and stored in memory array 302. Accordingly, control circuit 310 reads the calibration value stored in memory array 302, and outputs the read value as adjustment voltage Vtrim to bandgap reference circuit BGR, thereby always outputting reference voltage Vref and power supply voltage Vreg within a predetermined calibrated range.

Bandgap reference circuit BGR is a known technique and detailed circuit configuration and description thereof are thus omitted. In a wireless communication device, such as an RF tag, a DC voltage obtained by rectifying an AC voltage generated in a communication antenna, using a rectifier circuit, is input as input voltage Vin to power supply circuit 308.

Temperature sensor unit 320 is a temperature sensor that functions as a first current source that outputs a first current dependent on the ambient temperature of radiation dose detection device 300, using power supply voltage Vreg.

Temperature sensor unit 320 includes a plurality of resistance change elements 313, first node 320*a*, and second node 320*b*. The plurality of resistance change elements 313 have a structure shown in (c) of FIG. 1. First node 320*a* connects first electrode layers 316 of the plurality of resistance change elements 313. Second node 320*b* connects second electrode layers 314 of the plurality of resistance change elements 313. First node 320*a* is applied with power supply voltage Vreg. Second node 320*b* outputs the first current.

In this embodiment, temperature sensor unit 320 is configured by connecting the plurality of resistance change elements 313 in parallel, and the combined resistance is the value obtained by averaging the different resistances of the plurality of resistance change elements 313. Such a configuration is however not essential, and temperature sensor unit 320 may include one resistance change element 313.

Sensor circuit 312 includes radiation sensor unit 340 and detection circuit 350. Radiation sensor unit 340 functions as a second current source that outputs a second current dependent on a dose of radiation to radiation dose detection device 300, using power supply voltage Vreg. Detection circuit 350 outputs a first signal indicating the temperature corresponding to the magnitude of the first current, and a second signal indicating the dose of radiation corresponding to the magnitude of the second current.

Radiation sensor unit 340 includes transistor TRsp, resistance element R4, and resistance element R3. Transistor TRsp is a p-type MOS transistor, for example, with threshold voltage VT changing depending on the dose of radiation. Resistance element R4 is connected between the source and the gate of transistor TRsp. Resistance element R3 is connected between the gate of transistor TRsp and ground. One terminal (e.g., the source terminal) of transistor TRsp is applied with power supply voltage Vreg. The other terminal (e.g., the drain terminal) of transistor TRsp outputs the second current.

Detection circuit 350 includes selection circuit 345, ring oscillator 341, and counter circuit 342. Selection circuit 345 includes two switch elements 343 and 344 that are exclusively short-circuited so as to select one of the first current or the second current and output power supply current Iro as a third current. Ring oscillator 341 is supplied with power supply current Iro output from selection circuit 345, and outputs a clock signal with a frequency corresponding to power supply current Iro. Counter circuit 342 counts the clock signal output by ring oscillator 341 for a predetermined time period and outputs the obtained count value as the first signal or the second signal.

More specifically, ring oscillator 341 has an oscillation frequency that changes depending on the amount of power supply current Iro supplied to ring oscillator 341. The output of ring oscillator 341 is input as an operating clock signal to counter circuit 342. When a reset signal input from control circuit 310 is high, the count value is reset to zero. An enable signal input from control circuit 310 is high, counter circuit 342 counts the number of clock signals in accordance with the input clock signal. The time period in which the enable signal is high corresponds to the constant pulse width. The oscillation frequency of ring oscillator 341 is designed to be identifiable by count value Dat output from counter circuit 342.

Count value Dat output by counter circuit 342 is input to control circuit 310 and output to the outside of radiation dose detection device 300.

In selection circuit 345, when only switch element 343 is short-circuited, power supply current Iro is supplied from power supply voltage Vreg via the combined resistance of the plurality of resistance change elements 313 forming temperature sensor unit 320. The combined resistance of temperature sensor unit 320 has the excellent temperature characteristics as shown in FIG. 4. Count value Dat corresponding to the ambient temperature can thus be obtained.

On the other hand, in selection circuit 345, when only switch element 344 is short-circuited, the drain-source current determined by gate voltage Vpg and threshold voltage VT of transistor TRsp serves as power supply current Iro. That power supply current Iro is supplied to ring oscillator 341. Once radiation dose detection device 300 is exposed to radiation and threshold voltage VT of transistor TRsp changes, power supply current Iro changes accordingly. As a result, the oscillation frequency of ring oscillator 341 changes. This change in the oscillation frequency can be obtained as a change in count value Dat which is obtained from counter circuit 342. The degree of the exposure to the radiation can be obtained quantitatively. Note that the change in threshold voltage VT of transistor TRsp due to the exposure to the radiation is kept changed even after the end of exposure to the radiation.

Figure 6:
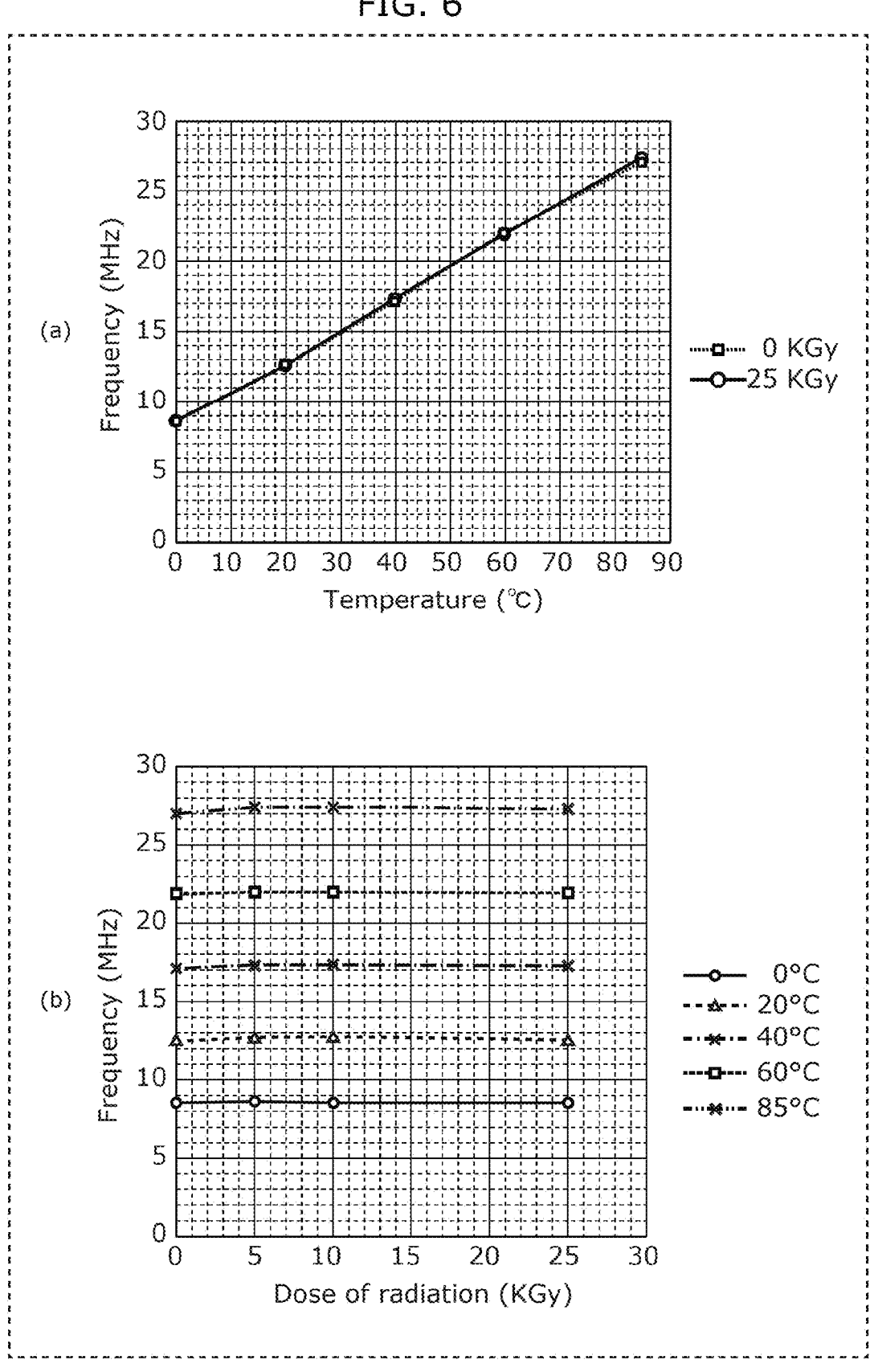
FIG. 6 shows an example result of measuring an ambient temperature using the temperature sensor unit and the sensor circuit included in the radiation dose detection device according to the embodiment.

FIG. 6 shows an example result of measuring an ambient temperature using temperature sensor unit 320 and sensor circuit 312 included in radiation dose detection device 300 according to the embodiment. The graph in (a) of FIG. 6, the horizontal axis represents the temperature, while the vertical axis represents the temperature characteristics using the value obtained by converting count value Dat obtained from counter circuit 342 into the frequency. Note that (a) of FIG. 6 shows the temperature characteristics (indicated by the broken line "0 KGy") at the initial stage before radiation dose detection device 300 is exposed to radiation, and the temperature characteristics (indicated by the solid line "25 KGy") measured after radiation dose detection device 300 has been exposed to the radiation of 25 KGy. As clear from the overlap between the broken line "0 KGy" and the solid line "25 KGy", it can be seen that there is little change in the temperature characteristics before and after the exposure to the radiation. It can also be found that the relation between the temperature and the frequency can be expressed by a substantially linear function.

The graph in (b) of FIG. 6 indicates radiation dose dependency characteristics with the horizontal axis representing the amount of the exposure to the radiation and the vertical axis representing the frequency. As clear from (b) of FIG. 6, the frequency is almost constant among the different temperatures. Note that the graphs in (a) and (b) of FIG. 6 show the results of measurement obtained by adjusting reference voltage Vref to make power supply voltage Vreg constant before and after the radiation.

That is, in a memory array using resistance change elements made of a transition metal oxide, some of the resistance change elements are kept in the initial state and arranged in parallel to form temperature sensor unit 320 with a combined resistance. The parallel combined resistance of this temperature sensor unit 320 exhibits an excellent change depending on a temperature. At the same time, the temperature characteristics are hardly influenced by exposure to radiation. Radiation dose detection device 300 according to this embodiment utilizes this fact, has undegraded accuracy in detecting the exposure to radiation, and can function as an excellent radiation-resistant temperature sensor.

However, the semiconductor integrated circuit forming radiation dose detection device 300 is an assembly of circuits including transistors. Threshold voltage VT changes due to exposure to radiation and causes variations in the circuit operation. In particular, reference voltage Vref output by bandgap reference circuit BGR serves as a standard of all the built-in analog circuits and is thus important.

In sensor circuit 312 shown in FIG. 5, once power supply voltage Vreg changes, the relation between the temperature detected by temperature sensor unit 320 and the oscillation frequency of ring oscillator 341 (i.e., the temperature characteristics) changes, thereby causing the problem of degraded sensing accuracy. In view of this problem, radiation dose detection device 300 according to this embodiment has a calibration function utilizing temperature sensor unit 320 with temperature characteristics hardly changed by exposure to radiation. The calibration function addresses a change in the characteristics of radiation dose detection device 300 due to exposure to radiation in detecting the dose of the radiation (i.e., recovers to the original characteristics). Calibration after exposure to radiation will be described below.

Figure 7:
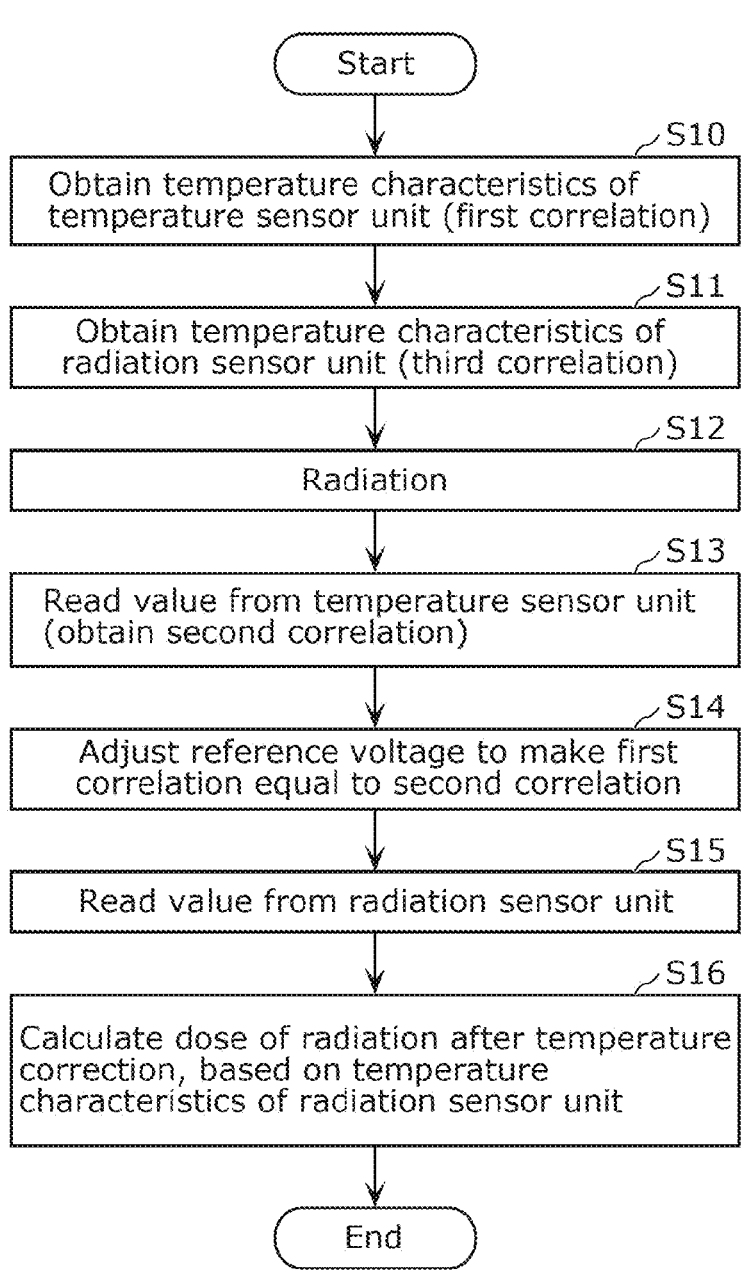
FIG. 7 is a flowchart showing a procedure of a radiation dose detection method including a calibration function of the radiation dose detection device according to the embodiment.

FIG. 7 is a flowchart showing a procedure of the radiation dose detection method including the calibration function of radiation dose detection device 300 according to the embodiment.

Note that radiation dose detection device 300 according to this embodiment adjusts adjustment voltage Vtrim to bring power supply voltage Vreg shown in FIG. 5 within a predetermined range at the time of pre-shipment inspection of radiation dose detection device 300. At this time, the adjusted value of adjustment voltage Vtrim is referred to as "value Vtrim0", and the obtained values of reference voltage Vref and power supply voltage Vreg are referred to as "value Vref0" and "value Vreg0", respectively.

First, the temperature characteristics are measured using temperature sensor unit 320 and sensor circuit 312 using power supply voltage Vreg of value Vreg0, and the result of measurement is stored in memory array 302 of non-volatile memory 301 (S10). More specifically, for example, at the room temperature of 25 degrees, control circuit 310 stores count value C25 obtained from counter circuit 342 of sensor circuit 312, and count value C85 at a temperature of 85 degrees in memory array 302. If the relation between the temperatures at the two points and the count values is known, the characteristic function of the temperature characteristics as shown in FIG. 4 are derived. The ambient temperature can be monitored based on the obtained count value. This step S10 corresponds to obtaining, before the radiation, the first correlation between the ambient temperature and the count value output by counter circuit 342 (i.e., temperature characteristics of temperature sensor unit 320), while the first current is selected by selection circuit 345 under the control by control circuit 310.

Subsequently, control circuit 310 obtains the already stored temperature characteristics of radiation sensor unit 340 from memory array 302 of non-volatile memory 301 (S11). For example, control circuit 310 obtains the function indicating how to correct the obtained dose of radiation depending on the ambient temperature, that is the function indicating the temperature dependency of the obtained dose of radiation. This step S11 corresponds to obtaining the third correlation indicating temperature dependency of the count value output by counter circuit 342, while the second current is selected by selection circuit 345.

For sterilization or other purposes, radiation dose detection device 300 is exposed to radiation (S12). After the exposure to radiation, power supply voltage Vreg adjusted by the trimming value of value Vtrim0 is changed by the influence of the radiation and is no more Vreg0.

To address the problem, calibration is performed after exposure to radiation. Now, the ambient temperature is clarified in advance by another thermometer and is referred to as "Tc". Radiation dose detection device 300 to be calibrated stores count value C25 and count value C85 in memory array 302 before shipment as described above (step S10). Thus, control circuit 310 reads count value C25 and count value C85 from memory array 302 so as to obtain the function indicating the temperature characteristics. From the obtained function of the temperature characteristics, expected count value Ct corresponding to current temperature Tc is calculated. Control circuit 310 then short-circuits only switch element 343 in selection circuit 345 and operates sensor circuit 312 so as to obtain the count value (S13). Control circuit 310 adjusts adjustment voltage Vtrim to make the count value equal to expected count value Ct (S14). This step S13 corresponds to obtaining, after the radiation, the second correlation between the ambient temperature and the count value output by counter circuit 342, using control circuit 310, while the first current is selected by selection circuit 345. Step S14 corresponds to adjusting the reference voltage, using control circuit 310 to make the first correlation equal to the second correlation.

Assume that Vtrim1 is adjusted value Vtrim and that value Vref1 and value Vreg1 are reference voltage Vref and power supply voltage Vreg, respectively, at the trimming value. In this case, value Vreg1 is equal to value Vreg0 as of before exposure to radiation. Calibrated value Vtrim is stored in memory array 302, whereby the trimming value is updated.

After the adjustment of value Vtrim, control circuit 310 short-circuits only switch element 344 in selection circuit 345, operates radiation sensor unit 340, and obtains a count value, thereby calculating the dose of radiation (S15). This step S15 corresponds to detecting the dose of radiation, while the second current is selected by selection circuit 345 under the control by control circuit 310.

In the end, control circuit 310 calculates the dose of radiation as of after the temperature correction from current temperature Tc and the dose of radiation obtained in step S15, based on the temperature characteristics of radiation sensor unit 340 obtained in step S11 (S16).

In this manner, utilizing the fact that temperature sensor unit 320 is hardly influenced by exposure to radiation, power supply voltage Vreg is calibrated, after exposure to radiation, to be the same voltage as of before the exposure to the radiation. The temperature characteristics of temperature sensor unit 320 are the same before and after the radiation as shown in FIG. 4. In addition, radiation sensor unit 340 operates at same power supply voltage Vreg as before the exposure to radiation, which address the degraded accuracy in measuring the dose of radiation. Temperature sensor unit 320 is thus provided as a radiation-resistant temperature sensor.

That is, the calibration of the power supply voltage described above is performed after the exposure to radiation to always make power supply voltage Vreg voltage constant. In this state, ring oscillator 341 is operated by power supply current Iro supplied by radiation sensor unit 340 and a count value is obtained by counter circuit 342. An accurate amount of exposure to radiation can be monitored which is not influenced by the exposure to radiation.

In FIG. 7, the order of the steps are not strictly determined. For example, step S11 may be performed at any stage before step S16. If the obtained first correlation is stored in memory array 302 in step S10, the first correlation may be obtained at any stage before step S14.

Figure 8:
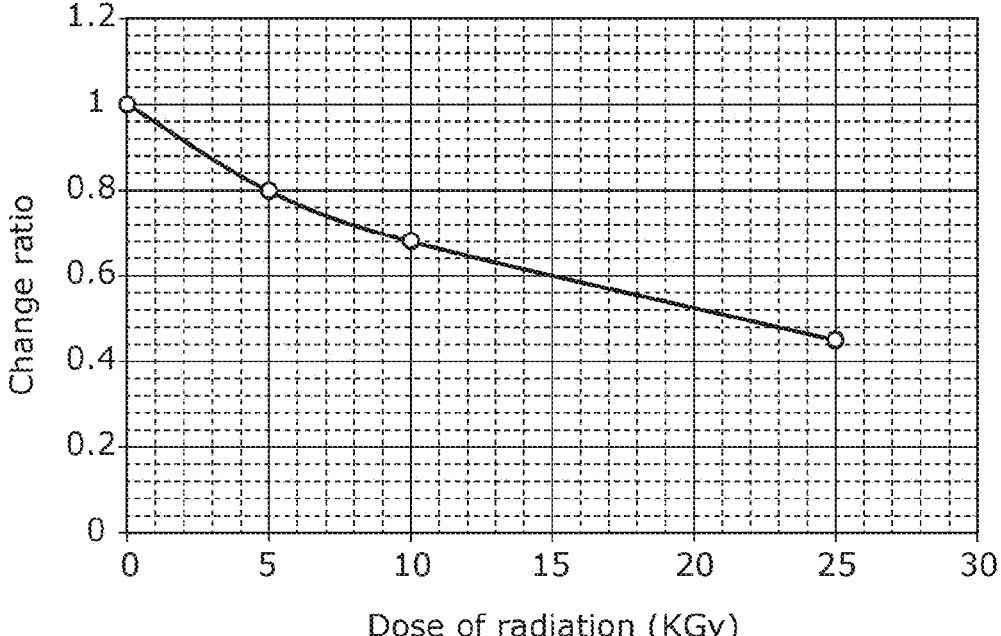
FIG. 8 shows an example relation between the dose of radiation to the radiation dose detection device according to the embodiment and the change ratio of the frequency based on the obtained count value.

FIG. 8 shows an example relation between the dose of radiation to radiation dose detection device 300 according to the embodiment (on the horizontal axis) and the change ratio of the frequency based on the obtained count value (on the vertical axis). Here, the result is obtained after performing the calibration method shown in FIG. 7. Note that the change ratio on the vertical axis is the change ratio of the frequency measured where the initial frequency before exposure to radiation is one. The frequencies of the radiation dose detection devices are different under influence of the individual differences due to the differences in the processes of the circuits. With the use of the change ratio instead of the frequency, the dose of radiation can be monitored without depending on the radiation dose detection device. As clear from FIG. 8, radiation dose detection device 300 according to this embodiment has a frequency that drops with a negative correlation with the dose of radiation. Utilizing this characteristic, an accurate amount of exposure to radiation is obtained which is hardly influenced by exposure to radiation, based on the count value output from counter circuit 342.

As described above, radiation dose detection device 300 according to this embodiment includes: power supply circuit 308 that outputs power supply voltage Vreg; temperature sensor unit 320 that functions as a first current source that outputs a first current dependent on the ambient temperature of radiation dose detection device 300, using power supply voltage Vreg; radiation sensor unit 340 that functions as a second current source that outputs a second current dependent on the dose of radiation to radiation dose detection device 300, using power supply voltage Vreg; and detection circuit 350 that outputs a first signal indicating the temperature corresponding to the magnitude of the first current, and a second signal indicating the dose of radiation corresponding to the magnitude of the second current. Temperature sensor unit 320 includes: one or more resistance change elements 313 each including first electrode layer 316, second electrode layer 314, and variable resistance layer 315 between first electrode layer 316 and second electrode layer 314, variable resistance layer 315 containing a transition metal oxide; first node 320a connecting first electrode layers 316 of one or more resistance change elements 313; and second node 320b connecting second electrode layers 314 of one or more resistance change elements 313. First node 320a is applied with power supply voltage Vreg. Second node 320b outputs the first current. The second current source includes transistor TRsp. One terminal of transistor TRsp is applied with power supply voltage Vreg. The other terminal of transistor TRsp outputs the second current.

Accordingly, radiation dose detection device 300 can not only detect the temperature using temperature sensor unit 320 but also address a change in the characteristics of the radiation dose detection device due to exposure to radiation utilizing the following characteristic. The characteristic is that temperature sensor unit 320 includes a resistance change element containing a transition metal oxide hardly influenced by exposure to radiation.

Here, the transition metal oxide is, for example, at least one of an aluminum oxide, a tantalum oxide, a hafnium oxide, or a zirconium oxide.

Radiation dose detection device 300 further includes non-volatile memory 301 of a variable resistance type including a plurality of resistance change elements 313 in an array. One or more resistance change elements 313 of temperature sensor unit 320 are part of the plurality of resistance change elements 313 forming the non-volatile memory. In this manner, one or more resistance change elements 313 of temperature sensor unit 320 are the part of the plurality of resistance change elements 313 forming non-volatile memory 301. Temperature sensor unit 320 and non-volatile memory 301 can be manufactured by a common process. The memory array forming non-volatile memory 301 typically includes, on the outer periphery, a dummy cell not to be used for storing data in order to ensure uniformity in the manufacturing process. Accordingly, the dummy cell is used for temperature sensor unit 320, which enables effective use of the circuit area without any need to newly add another device.

Detection circuit 350 includes: selection circuit 345 that selects one of the first current or the second current, and outputs the one selected as a third current; ring oscillator 341 that is supplied with the third current output from selection circuit 345, and outputs a clock signal with a frequency corresponding to the third current; and counter circuit 342 that counts the clock signal output by ring oscillator 341 for a predetermined time period, and outputs a count value obtained, as the first signal or the second signal. In this manner, common detection circuit 350 can measure the first current and the second current, which reduces the scale of the circuit.

Power supply circuit 308 includes: bandgap reference circuit BGR that generates reference voltage Vref that is adjustable; and regulator circuit 308a that outputs power supply voltage Vreg in accordance with reference voltage Vref. Accordingly, power supply voltage Vreg becomes adjustable. Reference voltage Vref is calibrated to maintain constant power supply voltage Vreg before and after the exposure to radiation, utilizing the fact that temperature sensor unit 320 is hardly influenced by the exposure to radiation. This allows the address to a change in the characteristics due to exposure to radiation. As a result, radiation-resistant temperature detection and radiation dose detection are achieved.

Radiation dose detection device 300 further includes: control circuit 310 that adjusts, based on a first count value, a first ambient temperature, a second count value, and a second ambient temperature, and reference voltage Vref to make a first correlation between the first count value and the first ambient temperature equal to a second correlation between the second count value and the second ambient temperature. The first count value is output by counter circuit 342 before the radiation. The first ambient temperature is a temperature at a time of outputting the first count value. The second count value is output by counter circuit 342 after the radiation. The second ambient temperature is a temperature at a time of outputting the second count value. Accordingly, constant power supply voltage Vreg can be maintained before and after the exposure to radiation, by adjusting reference voltage Vref so that temperature characteristics of temperature sensor unit 320 are the same before and after the exposure to radiation.

The radiation dose detection method according to this embodiment is a radiation dose detection method using radiation dose detection device 300. The radiation dose detection method includes: before radiation, obtaining a first correlation between the ambient temperature and the count value output by counter circuit 342, while the first current is selected by selection circuit 345; after the radiation, obtaining a second correlation between the ambient temperature and the count value output by counter circuit 342, while the first current is selected by selection circuit 345; adjusting the reference voltage to make the first correlation equal to the second correlation; and after the adjusting, detecting a dose of radiation, while the second current is selected by selection circuit 345.

Accordingly, constant power supply voltage Vreg can be maintained before and after the exposure to radiation by adjusting reference voltage Vref to maintain the same temperature characteristics of temperature sensor unit 320 before and after the exposure to radiation utilizing the fact that temperature sensor unit 320 is hardly influenced by exposure to radiation. As a result, radiation-resistant temperature detection and radiation dose detection are achieved.

The radiation dose detection method further includes: obtaining a third correlation indicating temperature dependency of the count value output by counter circuit 342, while the second current is selected by selection circuit 345. The detecting of the dose of the radiation includes calculating the dose of radiation as of after the temperature correction from the count value output by counter circuit 342 obtained by detecting the dose of radiation, based on the third correlation. Accordingly, the temperature dependency of radiation sensor unit 340 is corrected and the dose of radiation as of after the temperature correction is obtained.

While the radiation dose detection device and radiation dose detection method according to the present disclosure have been described above based on the embodiment, the present disclosure is not limited to the embodiment. The present disclosure may include forms obtained by various modifications to the foregoing embodiment that can be conceived by those skilled in the art or forms achieved by freely combining the elements and functions in the foregoing embodiment without departing from the scope and spirit of the present disclosure.

For example, while including ring oscillator 341 in the embodiment, detection circuit 350 does not necessarily include such a configuration. Detection circuit 350 may be any circuit such as one including a current voltage converter and an A/D converter, as long as capable of outputting a digital value dependent on power supply current Iro output from temperature sensor unit 320 or radiation sensor unit 340.

While power supply circuit 308 functions to adjust power supply voltage Vreg in the embodiment, a circuit that adjusts power supply voltage Vreg output from power supply circuit 308 may be provided outside power supply circuit 308.

INDUSTRIAL APPLICABILITY

The radiation dose detection device according to the present disclosure is configured by a semiconductor integrated circuit device for example, as a sensor that maintains excellent accuracy in sensing a temperature and the dose of radiation after the exposure to the radiation. The radiation dose detection device is subjected to a radiation sterilization process, while being attached to a subject whose life cycle is to be managed or a package housing the subject. The operating voltage of the circuit is calibrated through RF communications, so that the radiation dose detection device can be utilized as an RFID tag capable of managing the life cycle of the subject without degrading the sensing accuracy. That is, the radiation dose detection device is useful as an RFID free from the influence of radiation, the time and effort for attaching and detaching the RFID tag can be omitted, which is attached to the subject whose life cycle is to be managed.

The invention claimed is:

1. A radiation dose detection device comprising:
a power supply circuit that outputs a power supply voltage;

a first current source that outputs a first current dependent on an ambient temperature of the radiation dose detection device, using the power supply voltage;
a second current source that outputs a second current dependent on a dose of radiation to the radiation dose detection device, using the power supply voltage; and
a detection circuit that outputs a first signal indicating a temperature corresponding to a magnitude of the first current, and a second signal indicating a dose of radiation corresponding to a magnitude of the second current, wherein
the first current source includes:
one or more resistance change elements each including a first electrode layer, a second electrode layer, and a variable resistance layer between the first electrode layer and the second electrode layer, the variable resistance layer containing a transition metal oxide;
a first node connecting the first electrode layers of the one or more resistance change elements; and
a second node connecting the second electrode layers of the one or more resistance change elements,
the first node is applied with the power supply voltage,
the second node outputs the first current,
the second current source includes a transistor,
one terminal of the transistor is applied with the power supply voltage, and
an other terminal of the transistor outputs the second current.

2. The radiation dose detection device according to claim 1, wherein
the transition metal oxide is at least one of an aluminum oxide, a tantalum oxide, a hafnium oxide, or a zirconium oxide.

3. The radiation dose detection device according to claim 1, further comprising:
a non-volatile memory of a variable resistance type including a plurality of resistance change elements in an array, wherein
the one or more resistance change elements of the first current source are part of the plurality of resistance change elements forming the non-volatile memory.

4. The radiation dose detection device according to claim 1, wherein
the detection circuit includes:
a selection circuit that selects one of the first current or the second current, and outputs the one selected as a third current;
a ring oscillator that is supplied with the third current output from the selection circuit, and outputs a clock signal with a frequency corresponding to the third current; and
a counter circuit that counts the clock signal output by the ring oscillator for a predetermined time period, and outputs a count value obtained, as the first signal or the second signal.

5. The radiation dose detection device according to claim 4, wherein
the power supply circuit includes:
a bandgap reference circuit that generates a reference voltage that is adjustable; and
a regulator circuit that outputs the power supply voltage in accordance with the reference voltage.

6. The radiation dose detection device according to claim 5, further comprising:
a control circuit that adjusts, based on a first count value, a first ambient temperature, a second count value, and a second ambient temperature, the reference voltage to make a first correlation between the first count value and the first ambient temperature equal to a second correlation between the second count value and the second ambient temperature, the first count value being output by the counter circuit before radiation, the first ambient temperature being a temperature at a time of outputting the first count value, the second count value being output by the counter circuit after the radiation, the second ambient temperature being a temperature at a time of outputting the second count value.

7. A radiation dose detection method using the radiation dose detection device according to claim 5, the radiation dose detection method comprising:

before radiation, obtaining a first correlation between the ambient temperature and the count value output by the counter circuit, while the first current is selected by the selection circuit;

after the radiation, obtaining a second correlation between the ambient temperature and the count value output by the counter circuit, while the first current is selected by the selection circuit;

adjusting the reference voltage to make the first correlation equal to the second correlation; and after the adjusting, detecting the dose of the radiation, while the second current is selected by the selection circuit.

8. The radiation dose detection method according to claim 7, further comprising:

obtaining a third correlation indicating a temperature dependency of the count value output by the counter circuit, while the second current is selected by the selection circuit, wherein the detecting of the dose of the radiation includes calculating a dose of radiation as of after temperature correction from the count value output by the counter circuit obtained by the detecting of the dose of the radiation, based on the third correlation.

* * * * *